United States Patent [19]

Evans et al.

[11] 4,061,360
[45] Dec. 6, 1977

[54] COLLAPSIBLE GOLF BAG CART

[76] Inventors: Frank E. Evans; Dorothy D. Evans, both of 645 Cheowa Circle, Knoxville, Tenn. 37919

[21] Appl. No.: 660,145

[22] Filed: Feb. 23, 1976

[51] Int. Cl.² .......................................... B62B 11/00
[52] U.S. Cl. ............................ 280/652; 280/DIG. 6
[58] Field of Search ............... 280/645, 652, 653, 63, 280/287, 278, 288, DIG. 6; 301/111

[56] References Cited
U.S. PATENT DOCUMENTS

| | | | |
|---|---|---|---|
| 3,014,760 | 12/1961 | Gard | 280/645 |
| 3,222,100 | 12/1965 | Lindzy | 280/652 |
| 3,438,645 | 4/1969 | Pounders | 280/645 |

*Primary Examiner*—Robert R. Song
*Attorney, Agent, or Firm*—Clarence A. O'Brien; Harvey B. Jacobson

[57] ABSTRACT

A collapsible cart for carrying one or more golf bags while playing golf including a pair of large diameter wheels having an inflated pneumatic tire on each wheel and a foldable, lightweight, rigid frame of unique construction for positioning in a compact condition with folding of the frame between collapsed and extended positions enabling attachment and detachment of the independent wheels. The cart includes a unique U-shaped handle to facilitate movement of the cart by either pushing the cart or pulling the cart in the nature of a rickshaw. The handle is also pivotal for movement to a compact position alongside the frame. A pivotal bar is mounted on the frame to support the bottom portion of one or two golf bags and a tie cord is provided on the upper portion of the frame to retain the upper end portion of the bag or bags on the frame. Detachment of the frame from the wheels enables storage of the cart in relatively small spaces.

10 Claims, 4 Drawing Figures

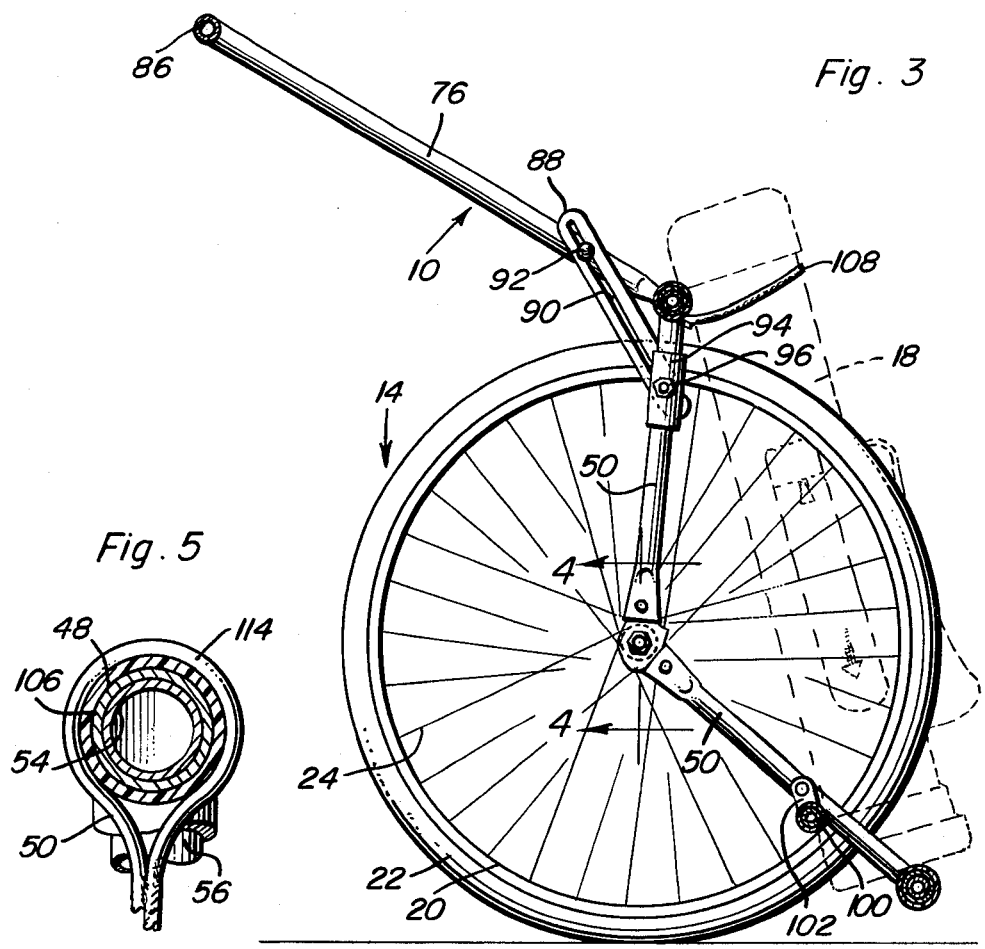
Fig. 3
Fig. 5
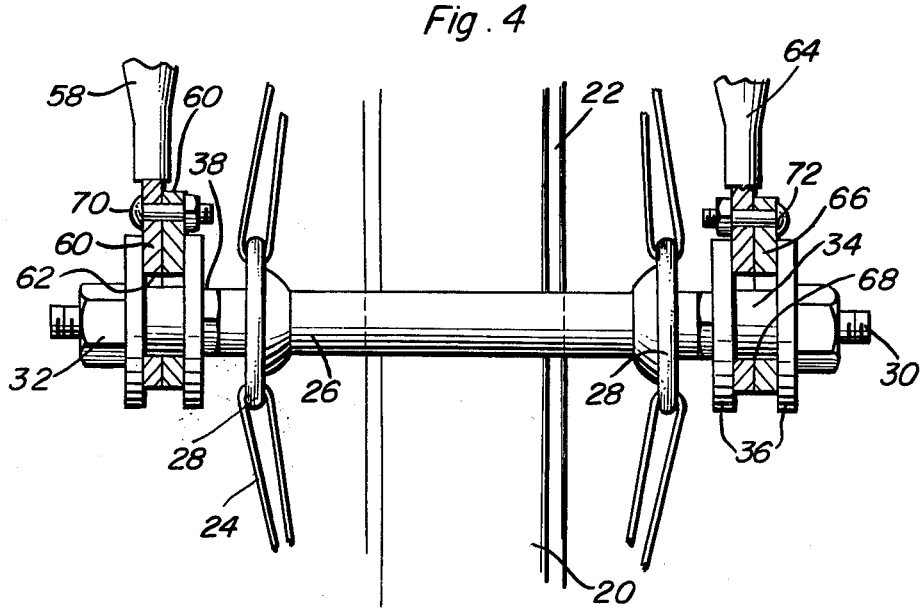
Fig. 4

COLLAPSIBLE GOLF BAG CART

BACKGROUND OF THE INVENTION

1. Field of the Invention

The present invention generally relates to golf bag carts and more particularly a foldable and collapsible cart incorporating a pair of large diameter wheels which are spaced a substantial distance from each other with a golf bag or golf bags supported on the frame between the wheels to provide a stable cart and one which is easily moved over a golf course.

2. Description of the Prior Art

When playing golf, it is frequently desirable to provide a cart to carry the golf bag. Various types of carts have been employed for this purpose including electrically powered carts which not only carry the golf bag but also the golfer. Many commercially available types of carts exist with one type of cart involving the use of a pair of relatively small diameter wheels which are moved between an extended and retracted position in response to pivotal movement of the cart handle. This type of cart is secured to the golf bag and, when collapsed, is usually carried along with the golf bag. While such devices have received some commercial acceptance, they are relatively difficult to control and are not too stable especially when traversing uneven terrain which is frequently encountered when playing golf. Also, this type of cart is capable of carrying only a single bag and in some instances, it is rather difficult to assemble the bag and cart and difficult to remove the bag from the cart. Other types of carts are available which have separate tubular compartments for the golf clubs and, in effect, constitute a wheeled golf club carrier rather than a cart for a golf bag.

SUMMARY OF THE INVENTION

An object of the present invention is to provide a golf bag cart utilizing a tubular lightweight frame structure in which the components are concentrically arranged for providing a rigid structure even though relatively lightweight aluminum tubing may be used.

Another object of the invention is to provide a golf cart employing relatively large diameter wheels that are spaced apart a substantial distance with the golf bag or bags being supported by the cart being at least partially received between the wheels to provide a well balanced, stable cart which can be easily controlled due to the wide spacing of the wheels and due to the manner of connecting the frame to the wheels with the wheels being completely independent of each other and each wheel being provided with a relatively short axle connected with the frame.

A further object of the invention is to provide a golf bag cart in accordance with the preceding objects in which the frame includes folding components with the pivotally connected components also including hook-like adapter units engaging and receiving opposed portions of the wheel axles for rigidly securing the wheels to the frame when the frame is extended and disengaging the frame from the wheels when the frame is folded to a compact condition.

Still another object of the present invention is to provide a golf bag cart in accordance with the preceding objects in which the frame is provided with a U-shaped handle which is also foldable to a retracted or extended position and which facilitates the cart being pushed forwardly by a golfer or enabling a golfer to position himself interiorly of the handle to enable the cart to be pulled somewhat in the nature of a rickshaw.

A still further object of the invention is to provide a golf bag cart in accordance with the preceding objects which is foldable and collapsible, capable of effectively supporting one or two golf bags, simple and lightweight in construction, easy to control and maneuver and stable when being pushed or pulled or when traversing uneven terrain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a vertical sectional view of the golf bag cart illustrating schematically the positioning of a golf bag thereon.

FIG. 4 is a detailed sectional view, on an enlarged scale, taken substantially upon a plane passing along section line 4—4 of FIG. 3 illustrating the wheel and axle together with the hook-like adapters on the frame and their relationship when the frame is assembled on the wheels.

FIG. 5 is a detailed sectional view, taken along section line 5—5 of FIG. 1 illustrating the concentric arrangement of the tubular members and the covering sleeve which engages the golf bag.

DESCRIPTION OF THE PREFERRED EMBODIMENTS

Figure 1:
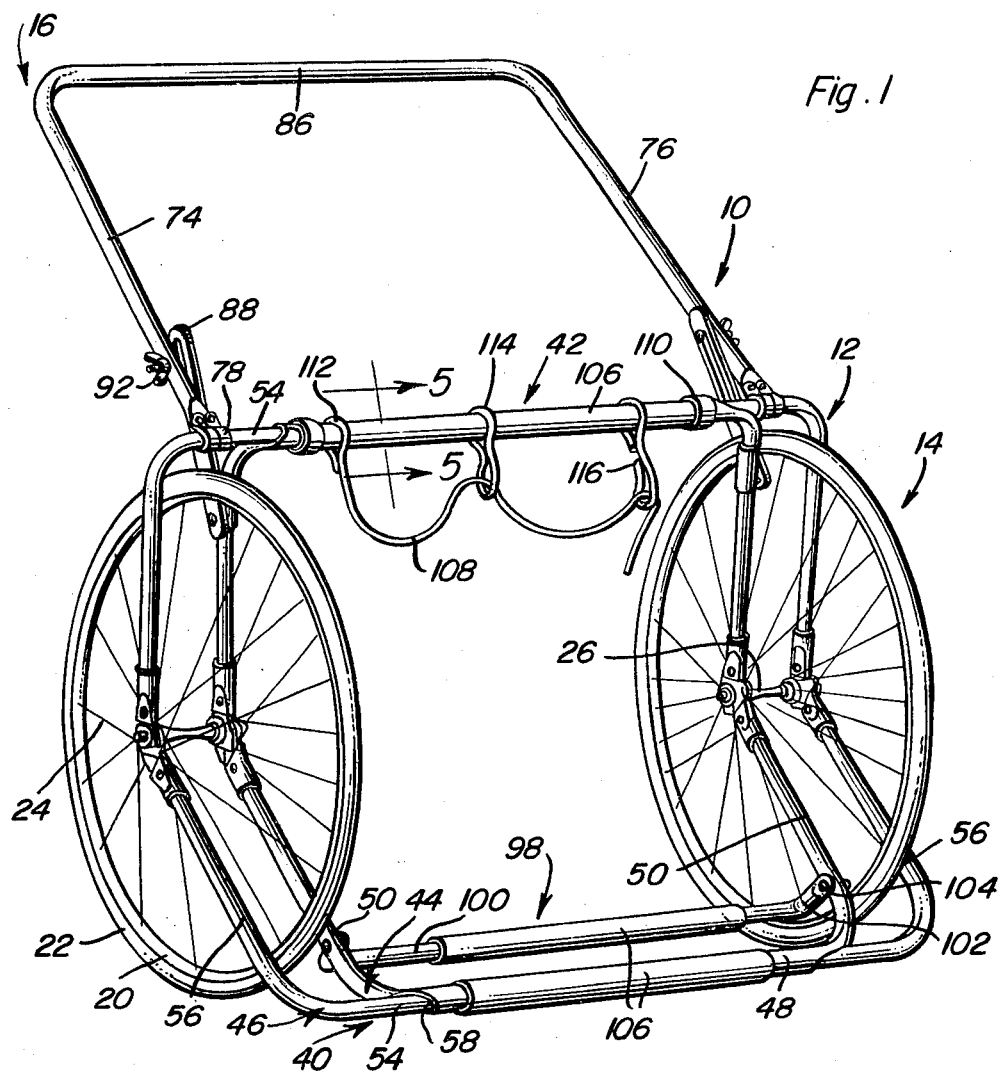
FIG. 1 is a perspective view of the collapsible golf bag cart of the present invention.

The collapsible golf bag cart of the present invention is generally designated by reference numeral 10 and includes a folding and collapsible frame generally designated by the numeral 12, a pair of supporting wheel assemblies generally designated by numeral 14 and a U-shaped handle assembly generally designated by numeral 16 for effectively supporting one or two conventional golf bags 18, as illustrated in broken lines like in FIG. 3.

Each of the wheel assemblies 14 includes a relatively large diameter wheel rim 20 having a pneumatic inflatable tire 22 thereon. The rim 20 includes a plurality of spokes 24 supporting a central hub 26 by virtue of being connected to end flanges 28 thereon which represents conventional bicycle tire and wheel structure with the diameter of the wheel being conveniently 26 inches. This type of tire and wheel assembly is quite lightweight in construction and is easily rolled along the surface of a golf course and will more easily pass over obstructions such as rocks, depressions or the like as compared with a relatively small diameter wheel such as employed on conventional golf bag carts.

As illustrated in FIG. 4, each wheel assembly 14 includes a central axle 30 having externally threaded end portions receiving retaining nuts 32 thereon which also represents conventional structure except that the axles 30 are slightly longer than usual and receive a sleeve 34 having two spaced flanges rigid therewith as designated by numeral 36. The sleeve 34 and flanges 36 form a spool which is rigidly secured to the axle 30 by the retaining nuts 32 clamping the spool fixedly in position between the nuts 32 and corresponding lock nuts 38 which are conventionally employed to retain the ball bearing adjustment between the axle 30 and the hub 26 in a well known manner. Thus, the wheel assemblies 14 are standard bicycle wheel assemblies except that the axle 30 includes a pair of spools fixedly secured thereto which are defined by the rigidly interconnected sleeve 34 and end flanges 36. These wheels are lightweight in construction and easily carried in a single hand when they are positioned alongside each other and the peripheries thereof grasped.

The frame 12 includes a pair of U-shaped frame assemblies 40 and 42. The frame assembly 40 includes a pair of U-shaped tubular frame members 44 and 46. The U-shaped frame member 44 includes a bight portion 48 and a pair of legs 50 which extend radially inwardly of the interior of the wheel assemblies 14. The U-shaped frame member 46 includes a bight portion 54 and a pair of legs 56 which extend radially of the wheel assembly 14 on the exterior thereof. This structure is accomplished by the bight portion 54 being longer than the bight portion 48. As illustrated in FIG. 1 and also in FIG. 5, the bight portion 54 is concentrically and telescopically received within the bight portion 48 with the curved juncture between the bight portion 48 and the legs 50 having an opening 58 which receives the bight portion 54 of the frame member 46. This construction provides an extremely rigid frame by virtue of continuous contact between the bight portions 48 and 54 and the legs 50 and 56 provide fork structures receiving the wheel assembly 14 somewhat in the nature of the fork structure provided on a bicycle frame for receiving a bicycle wheel.

The frame assembly 42 is identical in construction to the frame assembly 40 and, as illustrated in FIG. 3, is normally disposed in an angular relation to the frame assembly 40 so that when the bight portions of the frame assembly 40 are adjacent to ground surface, the bight portions of the frame assemblies 42 will be disposed generally vertically above the wheel assembly 14.

The inner end of each of the legs 50 is provided with an adapter 58 thereon which terminates in a hook-shaped member 60 which includes an inwardly facing notch or recess 62 therein. Each of the outer legs 56 is also provided with an adapter 64 having a hook-shaped member 66 provided with an inwardly facing notch or recess 68 therein. The adapters 58 on the legs 50 are pivotally secured together by a pivot bolt 70 spaced upwardly from the notches 62 and the adapters 64 are secured together by a pivot bolt 72 in alignment with pivot bolt 70. The hook-like extensions or members 60 and 66 are of plate-like construction and are secured fixedly to the adapters 58 and 64 in any suitable manner such as by riveting 74 and the adapters 58 and 64 are secured to the tubular legs 50 and 56 in a rigid secure manner of any suitable arrangement. With the frame assemblies 40 and 42 being pivotally connected by the aligned pivot bolts 70 and 72, the hook-like members 60 and 66 will be pivoted to a remote position when the frame assemblies 40 and 42 are pivoted towards each other from their extended position in FIG. 3 to their folded position in FIG. 2. When this occurs, the opposing notches 62 on the inner legs 50 and the opposing notches 68 on the outer legs 56 will move apart to the position shown in FIG. 2. The hook-like members 60 and 66 are of a thickness so that both plates will be received between the flanges 36 on the sleeve 34 as illustrated in FIG. 4 when the opposed notches are moved towards each other and the hook-like members 60 and 66 are oriented in overlapping position due to the pivotal movement of these members about the pivot bolts 70 and 72. When the frame assemblies 40 and 42 are in the position illustrated in FIGS. 1 and 3, the notches 62 and 68 are securely positioned around the sleeve 34 between the flanges 36 so that the frame 12 is securely mounted on the wheel assemblies 14 with the load of the frame, the friction of the pivot bolts and hook-like members and the weight of the golf bags serving to retain the wheels and frame in assembled position. When it is desired to fold or collapse the frame, the frame assemblies 40 and 42 are merely grasped and pivoted towards each other which releases the hook-like members 60 and 66 from engagement with the sleeve on the axles thus releasing the wheels from the frame 12 and enabling the frame 12 to be lifted off the wheels 14.

The one-piece handle assembly 16 is shaped and includes a pair of tubular leg members 74 and 76 which are substantially parallel to each other and which have their inner ends pivotally connected to the bight portion 54 of the U-shaped frame member 46 which forms part of the U-shaped frame assembly 42 by the use of a strap or flattened end 78 of the tubular member encircling the bight portion 54. The outer ends of the tubular leg members 74 and 76 define the U-shaped handle assembly. The bight member 86 is relatively long and provides sufficient distance for grasping the same with two hands for either pushing or pulling the cart. A person desiring to pull the cart in the manner of a rickshaw can position himself interiorly of the handle assembly 16 and grasp the bight member 86 and push the cart with the wheel assemblies and the bags positioned behind him.

In order to retain the handle assembly 16 in the rearwardly inclined position illustrated in FIGS. 1 and 3, each of the tubular leg members 74 and 76 is connected to a brace 88 having a longitudinal slot 90 therein connected with the respective tubular leg members 74 and 76 by a wing nut and bolt assembly 92. The lower end of the brace 88 is attached to the inner leg 50 of the U-shaped frame assembly 42 by a sleeve 94 and a pivot bolt 96. This enables the angular position of the handle assembly 16 to be varied and pivoted downwardly to a position generally paralleling the leg members 50 and 56 when the frame 12 is collapsed condition as illustrated in FIG. 2.

The bight portion 48 of the frame assembly 40 is provided with a golf bag supporting bar generally designated by numeral 98 of U-shaped construction and including a tubular member 100 supported in parallel relation to bight portion 48 by a pair of short leg members 102 and pivot pins or bolts 104. The tubular member 100 is thus able to swing freely about pivot pins 104 and engage the lower side portion of a golf bag or bags 18 resting on bight portion 48 as illustrated in FIG. 3, thus serving to retain the bottom of the golf bag 18 in supported position on the bight portion 18 and permitting the bag 18 to be easily lifted off the cart or placed thereon when the cart is set up.

As illustrated in FIGS. 1 and 3, the bight portion of the frame assembly 42 is provided with a sleeve 106 which engages the bag or bags 18 adjacent the upper rim thereof so that the inclined bags will normally rest in this position even when the bight portion of the frame assembly 40 contacts ground surface. To securely retain the upper ends of the bag or bags 18 in place, a tie strap 108 is connected to the bight portion of the frame assembly 42 and the tie strap can be easily tied around the upper end of one or two bags 18, as illustrated in FIG. 3. Also, each of the tubular members 48 and 100 which engage the golf bag or bags 18 is provided with a plastic sleeve similar to sleeve 106 to protect the bags 18 from discoloration and wear. The ends of sleeve 106 on tubular members 48 on frame assembly 42 are provided a section of larger tubing 110 secured thereto to form stops for the nylon cord loop member 112, 114 and 116 to which the nylon cord 108 is connected. If desired, the cord 108 may be directly connected to the plastic sleeve 106 by a simple knot at each end.

Figure 2:
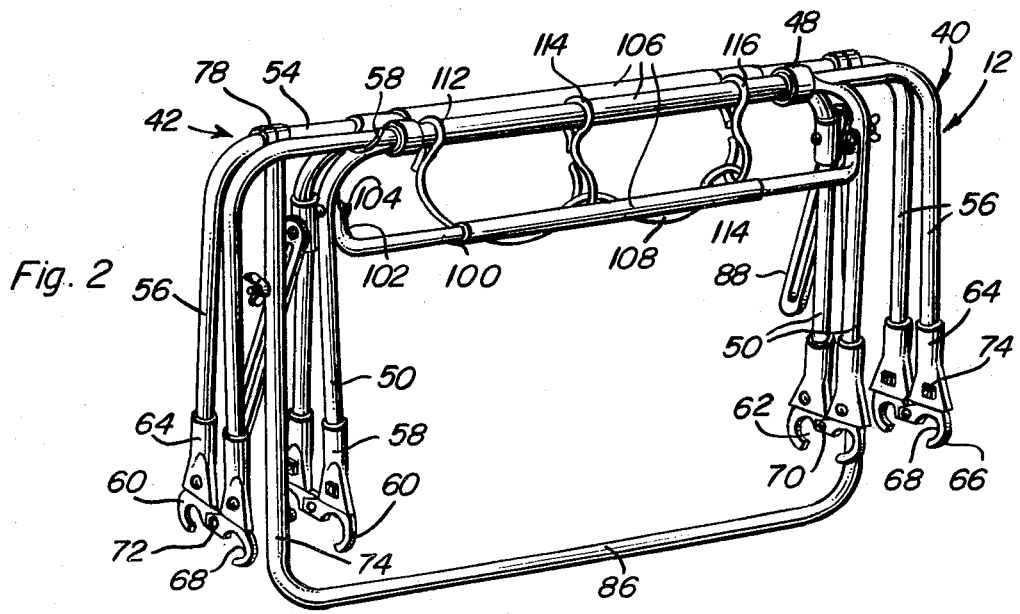
FIG. 2 is a perspective view of the frame of the golf bag cart removed from the wheels and folded to a compact condition.

The frame 12 may be easily stored when in the folded condition with the two wheels 14 being positioned alongside thereof, this is, lying flat against the frame 12 when in the condition illustrated in FIG. 2. The two wheels may be easily grasped with a single hand for handling or the entire assembly may be placed in a carrying bag of appropriate dimensions and with an appropriate handle. The frame and wheels may be easily assembled in a very short time with the frame first being inverted from the position of FIG. 2 with frame assembly 40 pivoted toward an angular position with respect to the frame assembly 42 and handle assembly 16 also pivoted to an angular position with respect to frame assembly 42 with the bight portions of the frame assemblies 40 and 42 resting on the ground surface.

In this position, the hook members 60 and 66 are still spread apart sufficiently to enable the wheel assemblies 14 to be dropped onto the facing notches 62 and 68 with the hook members 60 and 66 received between the flanges 36 on sleeve 34 of the spool. Then, the two U-shaped assemblies 40 and 42 are pivoted further apart to move the notches 62 and 68 toward each other until the hook-like members 60 and 66 are disposed in overlapping relation as illustrated in FIGS. 1, 3 and 4 which securely looks the wheel assemblies to the frame. The cart is then turned right side up and the handle assembly adjusted to the desired position and locked in position and a golf bag or bags placed on the cart. The lightweight aluminum tubing used in constructing the cart maintains the over-all weight thereof at a minimum and provides an effective support for one or two golf bags. Connecting the U-shaped handle through the frame directly to the axle provides greater control of the cart and the 26 inch ball bearing wheels with inflated pneumatic tires will roll along a surface with the least possible force which is substantially less than the force required to push or pull a smaller wheel conventional cart. When folded, the cart and wheels will fit in unused corner areas, automobile trunks, and the like, and will occupy very little space.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A golf bag cart comprising a frame, a pair of wheels supporting said frame for movement along a supporting surface, means on said frame supporting at least one golf bag, and handle means connected with the frame for enabling manual control and manipulation of the cart, said frame being foldable and including means engaging and securing the wheels to the frame when in extended position and releasing the wheels in response to movement of the frame to a folded condition for enabling storage of the wheels and frame in a compact condition, each of said wheels being provided with an axle projecting laterally from each side of the wheel, each end of each axle including a sleeve rigid thereon with each end of the sleeve having a flange rigid therewith, said frame including a pair of U-shaped frame assemblies having the end portions of the legs pivotally connected to enable the bight portions to pivot from a position generally alongside of each other to a position with the legs disposed in angular relation, said means securing and releasing the wheels including hook-like members on the free end portion of each leg of the U-shaped frame assembly and including facing notches which coact with each other for gripping engagement with the sleeves on the wheel axles when the U-shaped frame assemblies are pivoted so that the legs are disposed in angular relation to each other.

2. The golf bag cart as defined in claim 1 wherein each of said U-shaped frame assemblies includes a pair of U-shaped frame members having parallel, spaced legs and concentrically arranged bight portions with the inner concentric bight portion being longer than the outer concentric bight portion and extending through openings formed in the juncture between the outer bight portion and the legs disposed inwardly of the pair of legs integral with the inner concentric bight portion whereby the two legs on each of the U-shaped frame members are in alignment and define a fork for receiving the wheel.

3. The golf bag cart as defined in claim 2 wherein each of the legs of each U-shaped frame member is provided with a hook-like member on the free end portion thereof with the hook-like member having inwardly facing notches engaging the sleeves and flanges at the opposite ends of the two axles with the length of the bight portions of the U-shaped frame members being sufficient to receive two golf bags thereon and the wheels being spaced apart a substantial distance and having a large diameter with one U-shaped frame member being substantially vertically disposed with the bight portion thereof disposed immediately above the top periphery of the two wheels and the other U-shaped frame member being downwardly and forwardly inclined in relation to the axle with the bight portion thereof disposed forwardly of the periphery of the wheel then adjacent a ground surface whereby the lower end portion of a golf bag may be supported from the forward bight portion and the upper end portion of a golf bag may be supported from the bight portion of the vertical U-shaped frame member with the golf bag inclined in a manner to be retained in position by gravitational forces.

4. The golf bag cart as defined in claim 3 wherein said handle means is in the form of a substantially U-shaped tubular member having the bight portion substantially parallel to and coextensive with the bight portion of the vertically disposed U-shaped frame member with the end portions of the legs of the U-shaped handle being pivotally connected to the bight portion of the vertical U-shaped frame member, brace means retaining the U-shaped handle in adjusted angular relation to the vertical U-shaped frame member to facilitate balancing of the golf bag cart and enabling a person to position himself within the U-shaped handle to manipulate the cart in the nature of a rickshaw.

5. The golf bag cart as defined in claim 4 wherein the bight portion of the forwardly and downwardly inclined U-shaped frame member is provided with a golf bag support bar engageable with the periphery of a golf bag adjacent the bottom thereof, and flexible tie strap means on the bight portion of the vertical U-shaped frame member to encircle and secure the upper end portion of a golf bag thereto.

6. The golf bag cart as defined in claim 5 wherein the portions of the frame and support bar engaged by the golf bag are covered by a plastic sleeve.

7. The golf bag cart as defined in claim 5 wherein said support bar includes short laterally extending end legs pivotally connected to the legs of the downwardly inclined frame member for spacing the support bar laterally from the bight portion of the frame member engaging the bottom surface of the golf bag.

8. A collapsible cart comprising a foldable frame, wheel means supporting said frame for movement along a supporting surface, and means interconnecting the frame and wheel means securing the frame and wheel means together in response to movement of the frame from a collapsed inoperative condition to an extended operative condition and releasing said wheel means in response to folding movement of the frame to an inoperative collapsed condition, said frame including a pair of U-shaped frame assemblies having the end portions of the legs pivotally connected, said interconnecting means including a pair of opposed notches on the legs adjacent the pivotal connection for movement toward each other when the frame assemblies are pivoted toward extended operative condition and movement away from each other when the frame assemblies are pivoted toward collapsed inoperative condition, said wheel means including a pair of wheels, each wheel having an axle received in the notches when the frame assemblies are in operative condition, and released from the notches when the frame assemblies are in inoperative condition.

9. The cart as defined in claim 8 wherein said frame includes a U-shaped handle pivotally attached to one of said frame assemblies for propelling the cart, said handle being foldable to a position alongside of the frame assemblies and angularly adjustable to vary the balance characteristics of the cart to enable the cart to be pulled in the manner of a rickshaw.

10. A collapsible cart comprising a foldable frame, wheel means supporting said frame for movement along a supporting surface, and means interconnecting the frame and wheel means and securing the frame and wheel means together in response to movement of the frame from a collapsed inoperative condition to an extended operative condition and releasing said wheel means in response to folding movement of the frame to an inoperative collapsed condition, said frame including a pair of frame assemblies, said wheel means including a wheel having an axle, each frame assembly including a leg member extending toward said axle, the end portions of said leg members adjacent said axle being pivotally connected, said end portions of the leg members adjacent the pivotal connection having notch means incorporated therein for receiving said axle when the frame assemblies are pivoted to an operative position and releasing said axle when the frame assemblies are pivoted to an inoperative position.

* * * * *